United States Patent [19]

Okino et al.

[11] Patent Number: 5,867,217
[45] Date of Patent: Feb. 2, 1999

[54] PHOTOGRAPHING APPARATUS AND LENS POSITION CONTROL DEVICE

[75] Inventors: Tadashi Okino; Harunobu Ichinose, both of Yokohama, Japan

[73] Assignee: Canon Kabushiki Kaisha, Tokyo, Japan

[21] Appl. No.: 946,124

[22] Filed: Oct. 7, 1997

Related U.S. Application Data

[63] Continuation of Ser. No. 587,560, Jan. 17, 1996, abandoned, which is a continuation of Ser. No. 997,862, Dec. 29, 1992, abandoned.

[30] Foreign Application Priority Data

Jan. 8, 1992 [JP] Japan ..................................... 4-001565
Jan. 14, 1992 [JP] Japan ..................................... 4-023312

[51] Int. Cl.$^6$ .......................... G03B 17/00; H04N 5/225; H04N 5/262
[52] U.S. Cl. .......................... 348/358; 348/240; 348/333; 396/379
[58] Field of Search .................................. 348/240, 333, 348/345, 341, 347, 358, 207, 335; 396/374, 379, 84, 85

[56] References Cited

U.S. PATENT DOCUMENTS

| | | | |
|---|---|---|---|
| 4,843,475 | 6/1989 | Imai | 358/225 |
| 4,963,981 | 10/1990 | Todaka et al. | 358/213.13 |
| 4,969,044 | 11/1990 | Hijikata et al. | 358/227 |
| 5,023,722 | 6/1991 | Ryu | 358/224 |
| 5,107,334 | 4/1992 | Matsumoto | 358/180 |
| 5,420,632 | 5/1995 | Yamagiwa | 348/358 |

FOREIGN PATENT DOCUMENTS

| | | | |
|---|---|---|---|
| 4090274 | 3/1992 | Japan | H04N 5/232 |
| 497662 | 8/1992 | Japan | H04N 5/225 |
| 4329077 | 11/1992 | Japan | H04N 5/232 |

*Primary Examiner*—Bipin Shalwala
*Attorney, Agent, or Firm*—Robin, Blecker & Daley

[57] ABSTRACT

A lens position control device for a rear-focus type zoom lens includes a rear-focus type zoom lens, an image pickup element for converting an optical image formed by the zoom lens into an electrical signal, a signal processing circuit for executing signal processing of the electrical signal so as to obtain an electronic zooming effect, a focus detection circuit for detecting a focus adjustment state of the zoom lens, a memory for storing information associated with movement of a focusing lens group according to lens positions of a variable magnification lens group and a focusing lens group of the zoom lens, and a control circuit for, when it is determined based on an output from the focus detection circuit that the zoom lens is in an in-focus state, moving the focusing lens group on the basis of the position of the variable magnification lens group and the information stored in the memory, and for, when it is determined that the zoom lens is in an out-of-focus state, performing a zooming operation on the basis of a signal processing result of the signal processing circuit, and moving the focusing lens group on the basis of information detected by the focus detection circuit.

29 Claims, 12 Drawing Sheets

REFERENCE VERTICAL LINE

LATTICE REFERENCE PATTERN

PHOTOGRAPHING APPARATUS AND LENS POSITION CONTROL DEVICE

This is a continuation application under 37 CFR 1.62 of prior application Ser. No. 08/587,560, filed Jan. 17, 1996, now abandoned which is a continuation of Ser. No. 07/997,862 filed on Dec. 29, 1992, abandoned.

BACKGROUND OF THE INVENTION

1. Field of the Invention

The present invention relates to a photographing apparatus and, more particularly, to a photographing apparatus having an optical zoom function using a zoom lens, and a so-called electronic zoom function achieved by electrical processing of an image pickup means.

2. Related Background Art

Due to recent rapid spread of video cameras, the video cameras are required to have high performance, while the cameras are required to have zoom lenses having high zoom ratios, which can cope with various photographing situations. In recent years, zoom lenses having zoom ratios as high as ×6 to ×10 are provided, and zoom lenses having still higher zoom ratios are developed.

When a high zoom ratio is to be achieved by a zoom lens, the total length of the lens is normally increased, it becomes difficult to correct aberrations over the entire zoom area, and the cost of the lens tends to increase. For this reason, it is considerably difficult to provide a compact, low-cost zoom lens having a high zoom ratio.

In consideration of the above situation, there is proposed a technique associated with a so-called electronic zoom function for electrically enlarging an image on a monitor by processing electrical signals from an image pickup element such as a CCD, which function is added to a video camera so as to obtain a zooming effect in a wider range although the zoom ratio of an optical zoom function remains the same as a conventional one.

Japanese Patent Publication No. 52-15226 and Japanese Laid-Open Patent Application No. 1-280709 disclose techniques associated with focusing lens position control of a so-called rear-focus type zoom lens having the following advantages. That is, a zoom lens can be rendered compact by operating as a focusing lens group at least a lens group after a variable magnification lens group, and a photographing operation up to a closest object can be performed. The present invention provides a photographing apparatus, which does not adopt a simple system for operating an electronic zoom function so as to cover a wider zoom area after a zooming operation for an optical zoom area is completed, but can utilize the features of the rear-focus type zoom lens when the so-called electronic zoom function is added to the rear-focus type zoom lens.

More specifically, in the rear-focus type zoom lens, a focusing lens must be moved upon zooming even when an object remains at a position of a given distance. In particular, the rear-focus type zoom lens has an optical nature in that a focusing lens group has different focus extension amounts at the wide-angle side and the telephoto side. Therefore, in order to perform moving control of the focusing lens, as disclosed in, e.g., Japanese Laid-Open Patent Application No. 1-280709, information associated with the movement of the focusing lens is preferably stored in advance in a ROM (Read Only Memory) to move the focusing lens group according to the stored information, so that the focusing lens can trace a desirable cam path according to the lens positions of the zoom lens and the focusing lens.

In this case, the following problem is posed. That is, when the object distance abruptly changes during an optical zooming operation, the focusing lens traces a cam path for an object distance before the change, and always maintains an out-of-focus state. An AF (Auto-Focus) function may be adopted to attain an in-focus state. However, when the AF function cannot follow the zooming function, an in-focus state cannot be attained, either. In particular, a blurred state may be worsened in a zooming operation from the wide-angle side to the telephoto side even if the AF function is used.

SUMMARY OF THE INVENTION

It is the first object of the present invention to provide a photographing apparatus, which can reduce a blur amount occurring during a zooming operation by effectively using both optical and electronic zoom functions, and can perform the zooming operation while maintaining an in-focus state to the highest degree possible.

In order to achieve the first object, a photographing apparatus according to the first aspect of the present invention comprises a rear-focus type zoom lens, image pickup means for converting an optical image formed by the zoom lens into an electrical signal, signal processing means for executing signal processing of the electrical signal so as to obtain an electronic zooming effect, focus detection means for detecting a focus adjustment state of the zoom lens, storage means for storing information associated with movement of a focusing lens group in accordance with lens positions of a variable magnification lens group and the focusing lens group of the zoom lens, and control means for, when it is determined based on an output from the focus detection means that the zoom lens is in an in-focus state during a zooming operation, moving the focusing lens group on the basis of the position of the variable magnification lens group and the information stored in the storage means, and for, when it is determined that the zoom lens is not in an in-focus state, executing the zooming operation on the basis of a signal processing result of the signal processing means, and moving the focusing lens group on the basis of information detected by the focus detection means.

It is the second object of the present invention to provide a photographing apparatus, which switches functions between electronic and optical zoom functions, so that a stable zooming operation can be continuously performed when both the electronic and optical zoom functions are used.

In order to achieve the second object, a photographing apparatus according to the second aspect of the present invention comprises a rear-focus type zoom lens having a variable magnification lens group and a focusing lens group, image pickup means for converting an optical image formed by the zoom lens into an electrical signal, and signal processing means for processing the electrical signal so as to obtain an electronic zoom effect, the apparatus having an optical zoom function realized by moving the variable magnification lens group, and the electronic zoom function, wherein when a zooming operation is switched between the optical and electronic zoom functions, a zooming operation of one function is started before a zooming operation of the other function is stopped.

It is the third object of the present invention to provide a photographing apparatus which can perform a high-speed zooming operation by simultaneously using both optical and electronic zoom functions. In order to achieve the third object, according to the third aspect of the present invention, a photographing apparatus comprises a rear-focus type zoom lens having a variable magnification lens group and a focusing lens group, image pickup means for converting an optical image formed by the zoom lens into an electrical signal, and signal processing means for processing the electrical signal so as to obtain an electronic zoom effect, the apparatus having an optical zoom function realized by moving the variable magnification lens group, and an electronic zoom function, wherein the optical and electronic zoom functions are simultaneously operated.

It is the fourth object of the present invention to provide an image pickup apparatus, which facilitates so-called tilt correction by utilizing an electronic zoom function.

In order to achieve the fourth object, according to the fourth aspect of the present invention, there is provided an image pickup apparatus, which adopts a zoom lens in an image pickup optical system, and has an electronic zoom function for electronically performing a zoom operation of a signal read from an image pickup element, wherein after a magnification of a composition is determined by the electronic zoom function, a magnification of the zoom lens is changed to a magnification attained by the electronic zoom function.

According to the fifth aspect of the present invention, there is also provided an image pickup apparatus having the same function as that of a tilt lens by means of image processing, wherein when tilt adjustment is performed, a reference line is displayed on an electronic view finder so as to assist the tilt adjustment.

A limitation on the zooming speed of a conventional zoom lens disturbs quick determination of a composition by a photographer. However, according to the fourth aspect, a composition can be instantaneously determined using the electronic zoom function, which can desirably set a zooming speed, and the optical zoom lens is finally moved to a magnification position determined by the electronic zoom function, thereby eliminating deterioration of image quality caused by the electronic zoom function.

Furthermore, according to the fifth aspect, a reference line (the reference line means a line such as a solid line, broken line, or the like serving as a reference for tilt adjustment, and a vertical line and lines including vertical lines, e.g., lattice lines, can be used) is generated in an electronic view finder (EVF), and tilt (shift) adjustment is performed with reference to the reference line, so that a high-precision composition setting operation can be easily attained. When it is difficult to perform a high-precision composition setting operation due to a small screen of the EVF, an enlarged display may solve this problem.

The above and other objects and features of the present invention will become apparent from the specification and the drawings.

DETAILED DESCRIPTION OF THE PREFERRED EMBODIMENTS

Figure 1:
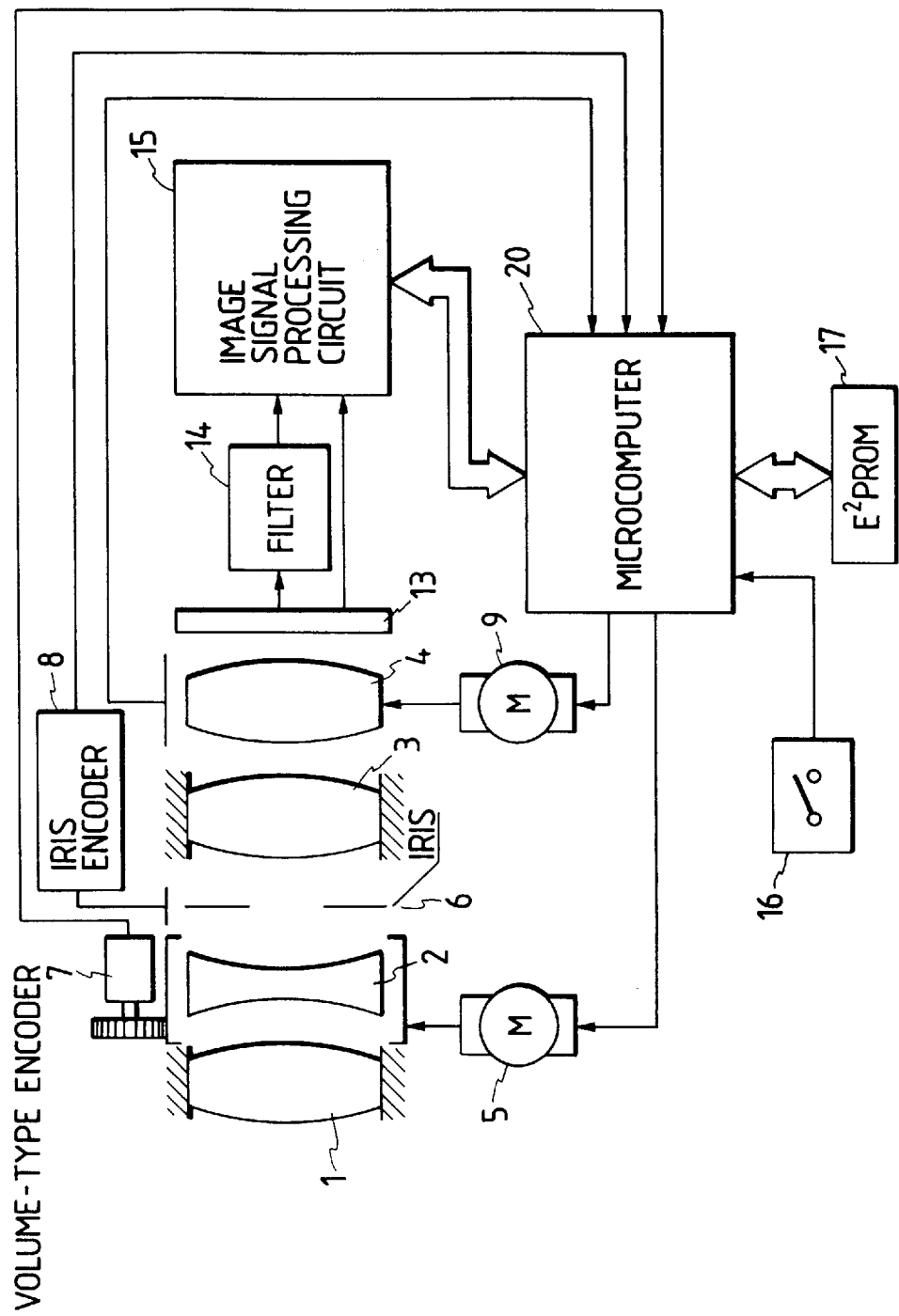
FIG. 1 is a block diagram showing a photographing apparatus according to the present invention.

An embodiment of a photographing apparatus according to the present invention will be described below. FIG. 1 is a control block diagram of a photographing apparatus according to the present invention. Referring to FIG. 1, lens groups 1, 2, 3, and 4 respectively have positive, negative, positive, and positive refracting powers in the order named. The second lens group 2 as a variator and the fourth lens group 4 as a compensator are moved along the optical axis to perform a zooming operation, and the fourth lens group 4 is moved to attain a focusing operation. Note that the first and third lens groups 1 and 3 always stand still. An iris 6 is arranged between the second and third lens groups 2 and 3. The second and fourth lens groups are respectively driven by motors 5 and 9. In particular, the motor 9 comprises a stepping motor. A zoom encoder 7 and an iris encoder 8 are volume-type encoders, and respectively detect the positions of the second lens group and the iris 5.

An image pickup element 13 such as a CCD (charge coupled device) converts an optical image formed by a zoom lens into an electrical signal. A high-pass filter 14 passes only a high-frequency component of the electrical signal. An image signal processing circuit 15 processes a signal output from the image pickup element 13, and processes the electrical signal output from the filter 14 on the basis of a known contrast method, thereby detecting the focus adjustment state of the zoom lens. An operation switch 16 is used for generating a zooming designation output, and can select whether the zooming speed is set to be a standard speed or a high speed although not shown. An $E^2PROM$ 17 stores information associated with a position where the fourth lens group is located according to the object distance and the position of the second lens group. A so-called rear-focus zoom lens according to the present invention has characteristics in that an in-focus state cannot be obtained unless the fourth lens group (focusing lens) is moved along a predetermined zoom path during a zooming operation even when the object distance remains the same, unlike in a conventional front focus type zoom lens. The focusing lens has different extension amounts at the wide-angle side and telephoto side. In particular, the focusing lens must have a small extension amount at the wide-angle side and a large extension amount at the telephoto side. In consideration of such characteristics, the E$^2$PROM stores the focusing position of the fourth lens group according to the object distance and the position of the second lens group. Note that the storage information is determined in a lens design stage. A microcomputer 20 performs processing to be described later.

Figure 3:
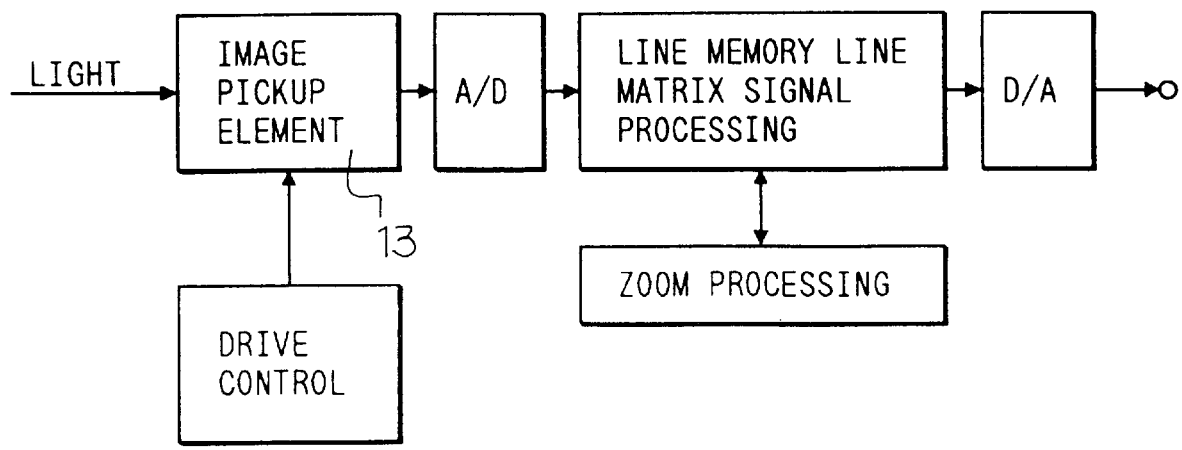
FIG. 3 is a block diagram showing an arrangement for processing an output from an image pickup element.
Figure 4:
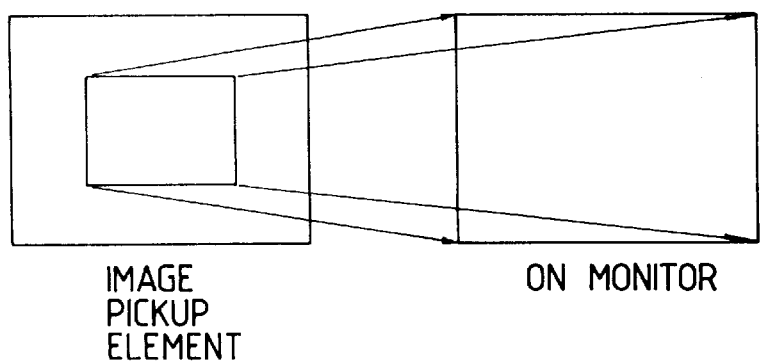
FIG. 4 is a view showing the principle of an electronic zoom function.

FIG. 3 is a block diagram showing an arrangement for realizing an electronic zoom function. The image pickup element 13 is driven by the microcomputer, and a digital signal output from the image pickup element is supplied to a signal processing circuit after A/D conversion. The signal processing circuit executes known line memory line matrix processing, and an electronic zoom operation is performed, as shown in FIG. 4, upon interfacing with a digital LSI for executing electronic zoom processing. In this manner, the central portion on the photo-sensitive surface of the image pickup element is displayed on a TV monitor in an enlarged scale, thereby obtaining the same change in magnification as in an optical zoom function.

When a zoom magnification attained by the optical zoom function is represented by A, and a zoom magnification attained by the electronic zoom function is represented by B, a magnification based upon a combination of these two functions becomes A×B times. For example, when a ×6 optical zoom lens and a ×2 electronic zoom function are combined, a camera having a ×12 zoom ratio can be obtained.

Figure 5:
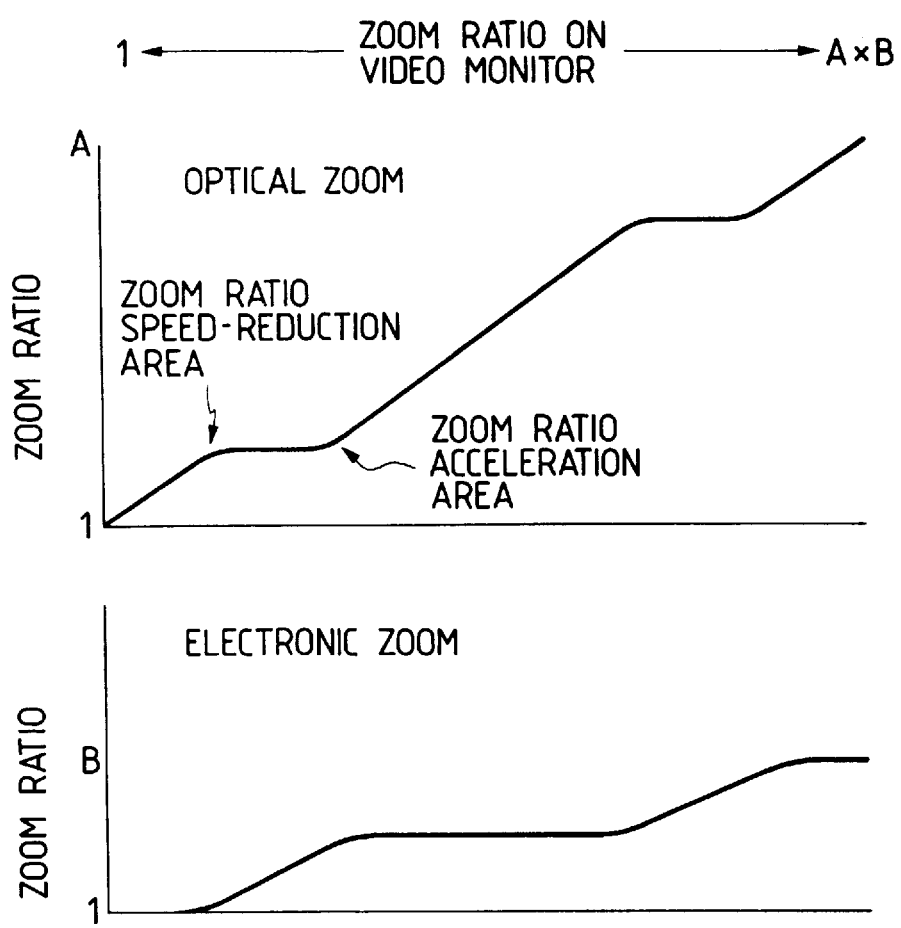
FIG. 5 is a view showing a switching state between optical and electronic zoom functions according to the present invention.

A change in magnification between a Wid (wide-angle) end (×1) and a Tel (telephoto) end (×12) is attained by combining the optical and electronic zoom functions, as shown in FIG. 5.

Figure 2:
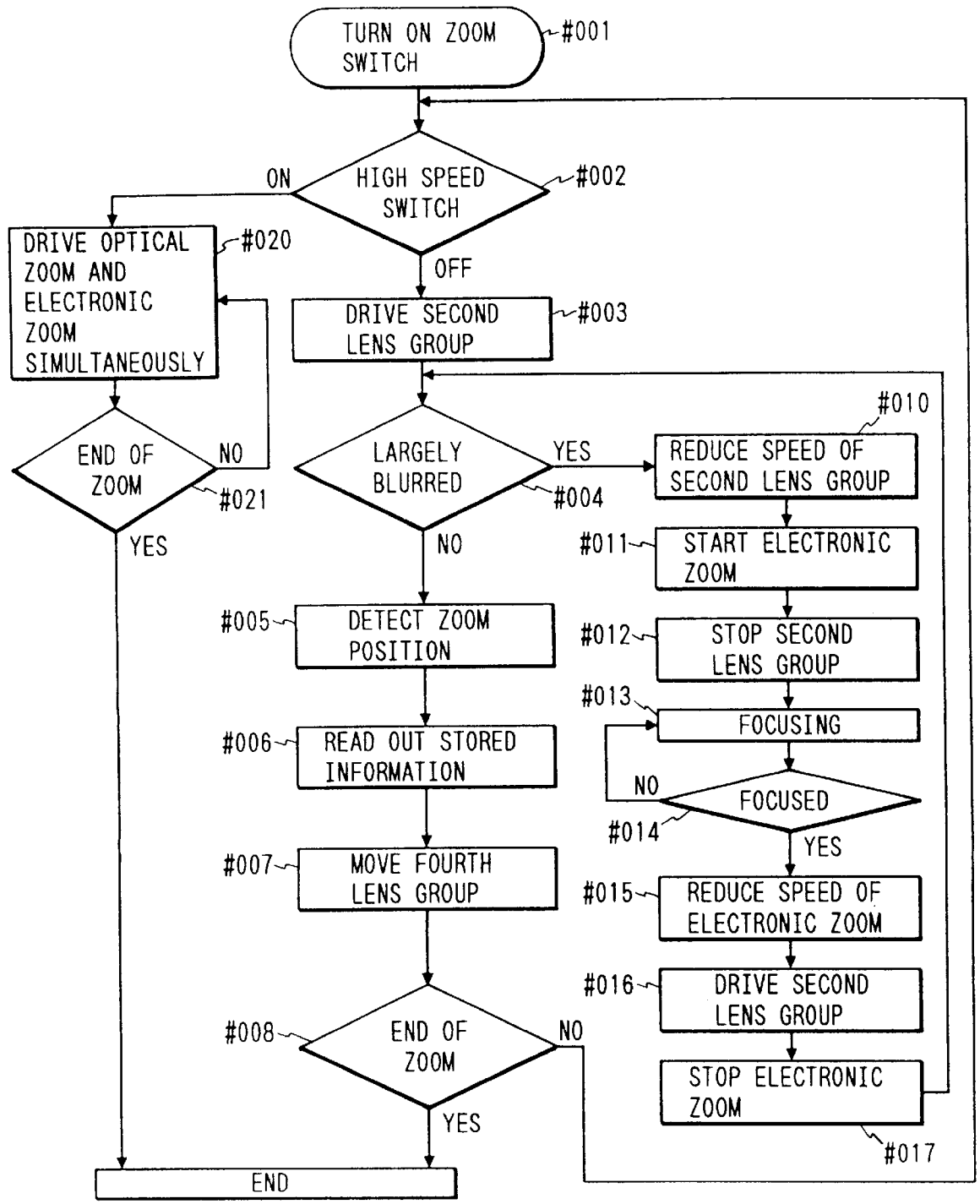
FIG. 2 is a flow chart showing control of the photographing apparatus according to the present invention.

The control flow of the photographing apparatus according to the present invention will be described below with reference to FIG. 2.

It is checked if a zoom instruction is currently output by a zoom switch during a normal photographing operation (#001). It is then checked if the zoom instruction is a high speed instruction or a standard speed instruction (#002).

If it is determined that zoom instruction is not a high-speed instruction, the driving operation of the second lens group at a standard speed is started via the motor 3 (#003).

When the focus adjustment state of the zoom lens is discriminated, if the blur amount is equal to or smaller than a predetermined threshold level, i.e., if it is determined that an in-focus state is attained, the positions of the second and fourth lens groups are detected (#005).

Note that the position of the fourth lens group can be detected by counting the number of pulses of the motor 9.

Position information corresponding to the zoom position and indicating a position to which the fourth lens group is to be moved is read out from the E$^2$PROM on the basis of the zoom position information (#006). The fourth lens group is then moved on the basis of the readout information and the zoom detection information (#007). In this manner, the fourth lens group can correctly trace a cam path in an in-focus state. If the end of zoom is reached, the second lens group is stopped; otherwise, the flow returns to step #002 (#008).

A flow (#010 to #012) executed when it is determined upon detection of a previous focus state that the blur amount is large will be described below. In this case, after the speed of the second lens group is reduced, the electronic zoom processing based on video signal processing is started. Then, the second lens group is completely stopped (#010 to #012). The reason why the optical zoom function is switched to the electronic zoom function is as follows. That is, if the lens traces the above-mentioned stored cam path according to the zoom position in a largely blurred state, the second and fourth lens group are continuously moved always in an out-of-focus state. In particular, when a zooming operation is performed from the wide-angle side to the telephoto side, the fourth lens group is moved in a direction to increase the blur amount. On the other hand, in a zooming operation from the telephoto side to the wide-angle side, the lens traces the cam path in a direction to converge the blur amount. However, a shift in cam path may occur due to a change in environmental temperature, and the lens cannot often trace the cam path correctly.

The reason why the optical zoom function is not instantaneously switched to the electronic zoom function is as follows. That is, it is practically difficult to immediately stop the second lens group or to move the second lens group at a constant speed, and a time lag is generated. When an abrupt switching operation is performed, the zoom speed is immediately increased or decreased, resulting in an unstable state. In this embodiment, in order to prevent such an unstable operation upon switching from the optical zoom function to the electronic zoom function or vice versa, and to allow a smooth zooming operation, control is made in such a manner that one zooming operation is started before the other zooming operation is completely stopped, as shown in FIG. 5, and the two zooming operations overlap each other.

When the second lens group is stopped, i.e., when the optical zoom function is completely switched to the electronic zoom function, the fourth lens group is moved, and it is then checked if an in-focus state is attained (#013 and #014). When the focusing lens enters an in-focus region, since it is determined that the fourth lens group can trace a predetermined zoom path, the electronic zoom function is switched to the optical zoom function. At this time, for the same reason as that mentioned above, the speed of the electronic zooming operation is reduced, the driving operation of the second lens group is then started, and thereafter, the electronic zooming operation is completely stopped (#015 to #017).

Figure 6:
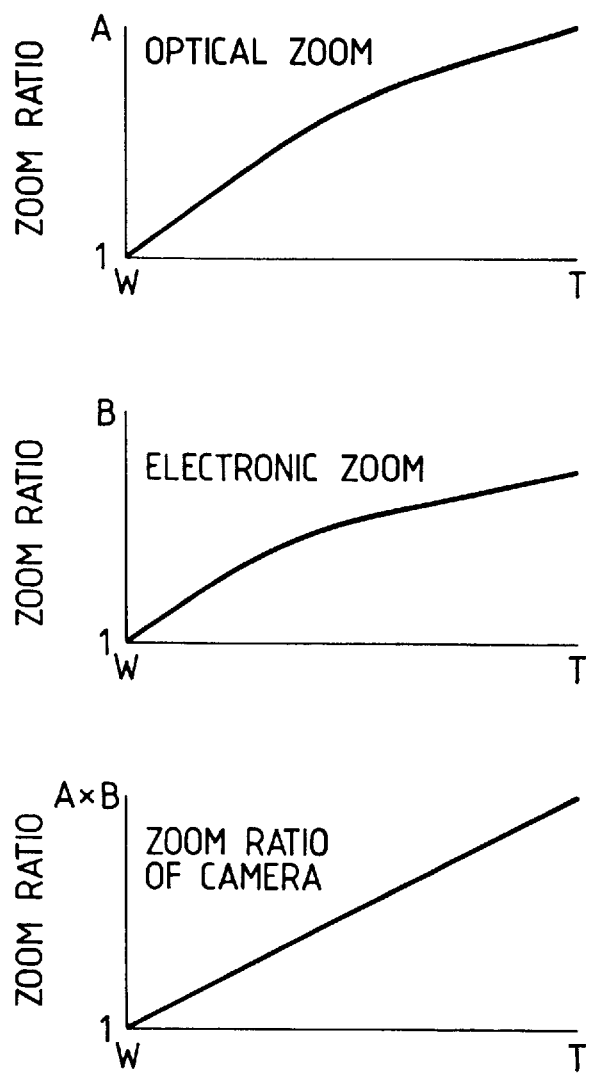
FIG. 6 is a view showing a state wherein optical and electronic zoom functions are simultaneously driven according to the present invention.

In the above embodiment, the switching operation between the optical and electronic zoom functions has been mainly described. When the high-speed zooming operation is to be performed over the entire zoom region of the optical and electronic zoom functions, the photographing apparatus of this embodiment has a mode for simultaneously driving the optical and electronic zoom functions, as shown in FIG. 6 (#002 to #020 and #021).

As described above, according to this embodiment, when a focus detection device determines an out-of-focus state during a zooming operation, the optical zoom function is switched to the electronic zoom function, and the focusing lens is moved based on the output from the focus detection device to enter the in-focus region. Thus, the photographing apparatus which is free from a largely blurred state, and has good followability can be obtained.

Upon switching between the optical and optical zoom functions, one zooming operation is started before the other zooming operation is stopped, thus allowing a continuous, smooth zooming operation.

A photographing apparatus which can attain a high-speed zooming operation by simultaneously driving the electronic and optical zoom functions can be provided.

Another embodiment of the present invention will be described below.

Since the above-mentioned "electronic zoom function" performs thin-out processing upon reading signals from the image pickup element, some deterioration of image quality inevitably occurs. However, since a zooming operation can be completely electronically realized, the zooming speed can be arbitrarily increased (or decreased). Therefore, there is almost no limitation upon setting of the zooming speed.

A limitation on the zooming speed of a conventional zoom lens disturbs quick determination of a composition by a photographer. However, according to this embodiment, a composition can be instantaneously determined using the electronic zoom function, which can desirably set a zooming speed, and the optical zoom lens is finally moved to a magnification position determined by the electronic zoom function, thereby eliminating deterioration of image quality caused by the electronic zoom function.

This embodiment will be described below with reference to the accompanying drawings.

Figure 7:
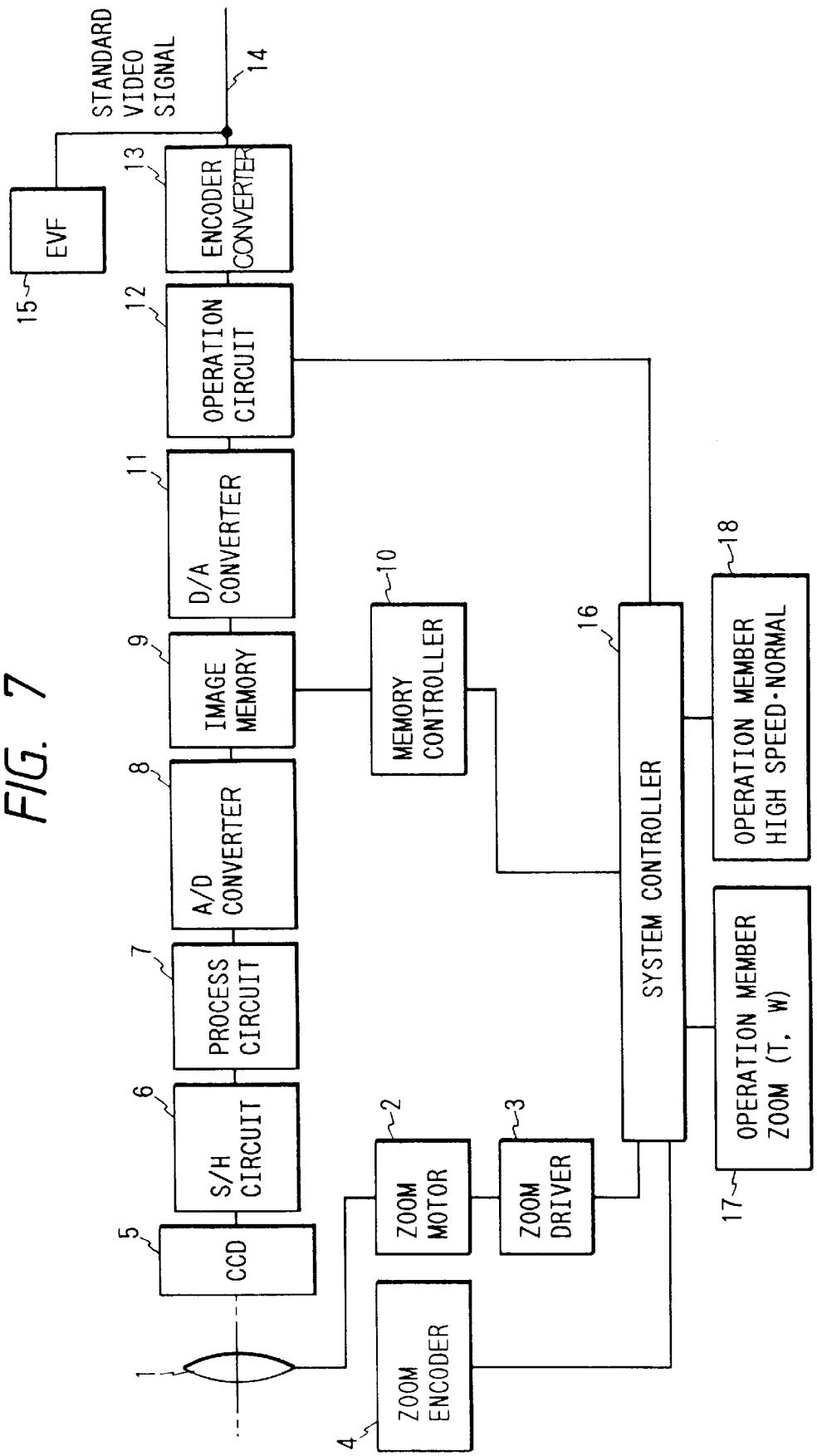
FIG. 7 is a block diagram showing an arrangement of an embodiment of an image pickup apparatus according to the present invention.

FIG. 7 is a block diagram showing an arrangement of an image pickup apparatus according to the embodiment of the present invention. Referring to FIG. 7, an optical system 1 forms an object image on a photoelectric conversion surface of an image pickup element (to be described later). Note that the optical system 1 has a magnification (focal length) change (zoom) function. A zooming mechanism is driven by a zoom motor 2, which is driven by a zoom driver 3. A zoom encoder 4 detects the current magnification (focal length) value.

An image pickup element 5 (comprising, e.g., a CCD type sensor, a MOS type sensor, an image pickup tube, or the like) converts an optical image of an object into an electrical signal. A sample & hold (S/H) circuit 6 samples and holds a signal read from the image pickup element 5. A process circuit 7 performs pre-processing of a signal. An A/D conversion circuit 8 converts a pre-processed signal into a digital signal. An image memory 9 stores a digital image signal A/D converted by the A/D conversion circuit 8 for one frame. A memory controller 10 controls a read/write access to the image memory 9.

A D/A conversion circuit 11 converts a digital image signal read out from the image memory 9 into an analog signal. An operation circuit 12 executes an interpolation operation for a partial (thin-out) read access to the image memory 9 to attain an enlargement function (to be described later). An encoder circuit 13 converts the analog signal output from the operation circuit 12 into a standard video signal such as an NTSC signal. The standard video signal is output onto a signal line 14.

An electronic view finder (EVF) 15 is used for determining a composition, and confirming an object to be photographed. A system controller 16 detects and controls the states of the circuit components, and can be constituted by a versatile microprocessor.

A zooming operation member 17 has three states, i.e., a telephoto side, a wide side, and a non-operation state. An operation member 18 is used for designating a zoom operation mode, i.e., designating whether a normal zooming operation is performed using only the zoom motor 2 or the so-called "electronic zoom function" for changing the read magnification from the image memory 9 is used together with a normal zooming operation.

The operation will be described below with reference to the block diagram of FIG. 7 and the flow charts of FIGS. 8 and 9.

For the sake of simplicity, this embodiment adopts the image memory 9 for storing information for the entire frame. However, a line memory for one line or several lines may be used to simplify the circuit arrangement, and a low-cost apparatus may be provided.

Figure 8:
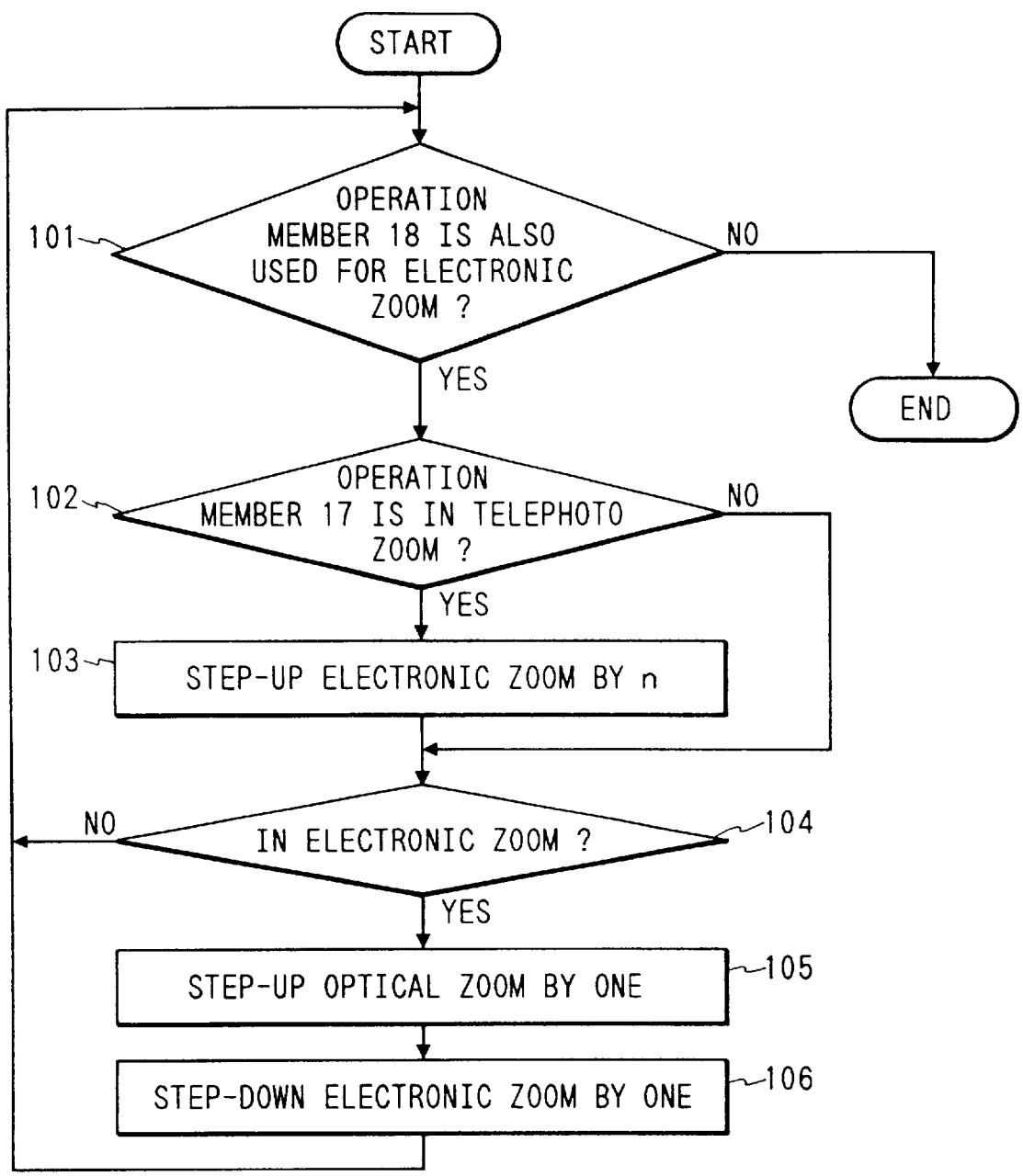
FIG. 8 is a flow chart for explaining an operation of the embodiment shown in FIG. 7.

FIG. 8 is a flow chart for explaining the operation of an image pickup apparatus according to the embodiment shown in FIG. 7.

When the operation member 18 is not set in a mode for using an electronic zoom function together with a normal zoom function, a known operation is performed by a known circuit. For this reason, a case will be mainly described below wherein the operation member 18 is set in the mode for using the electronic zoom function together with the normal zoom function.

As shown in FIG. 8, the system controller 16 checks the state of the operation member 18, and checks if the mode for using the electronic zoom function together with an optical zoom function is set (step 101). If NO in step 101, since a known operation mode is set, the operation is ended.

If the mode for using the electronic zoom function together with the optical zoom function is set (YES in step 101), the operation state of the operation member 17 is detected, and it is checked if the operation member 17 is operated to the telephoto side (step 102). If the operation member 17 is operated to the telephoto side (YES in step 102), the system controller 16 issues an instruction to the memory controller 10 and the operation circuit 12 to shift the electronic zoom function to the telephoto side (enlargement side) by n steps (step 103). In this case, n is an integer larger than 1. If the operation member 17 is not operated to the telephoto side (NO in step 102), the flow skips step 103.

It is then checked based on the states of internal variables of the system controller 16 if the electronic zoom function is active (step 104). If the electronic zoom function is active (YES in step 104), the optical zoom mechanism is shifted toward the telephoto side by one step (step 105), and at the same time, the electronic zoom function is shifted toward the smaller side (wide side) by one step to cancel the telephoto shift of the optical zoom mechanism (step 106). Thereafter, the flow returns to step 101. If the electronic zoom function is not active (NO in step 104), the flow returns to step 101.

With the above-mentioned operation, when the operation member 18 is set in the mode for using the electronic zoom function together with the optical zoom function, and the operation member 17 is operated toward the telephoto side, a zooming operation can be quickly attained by mainly the electronic zoom function in the following loop:

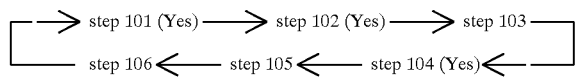

After the zooming operation by the electronic zoom function is completed, when the operation member 17 is returned to a non-operation state, the electronic zoom function is replaced with the optical zoom mechanism in the following loop:

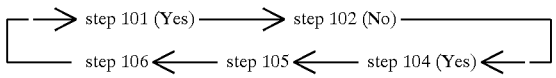

Upon completion of the replacement of the electronic zoom function with the optical zoom mechanism, NO is determined in step 104, and the controls enters the following loop:

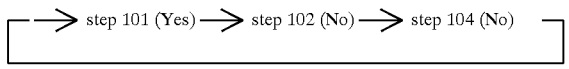

However, in practice, no operation is made.

Figure 9:
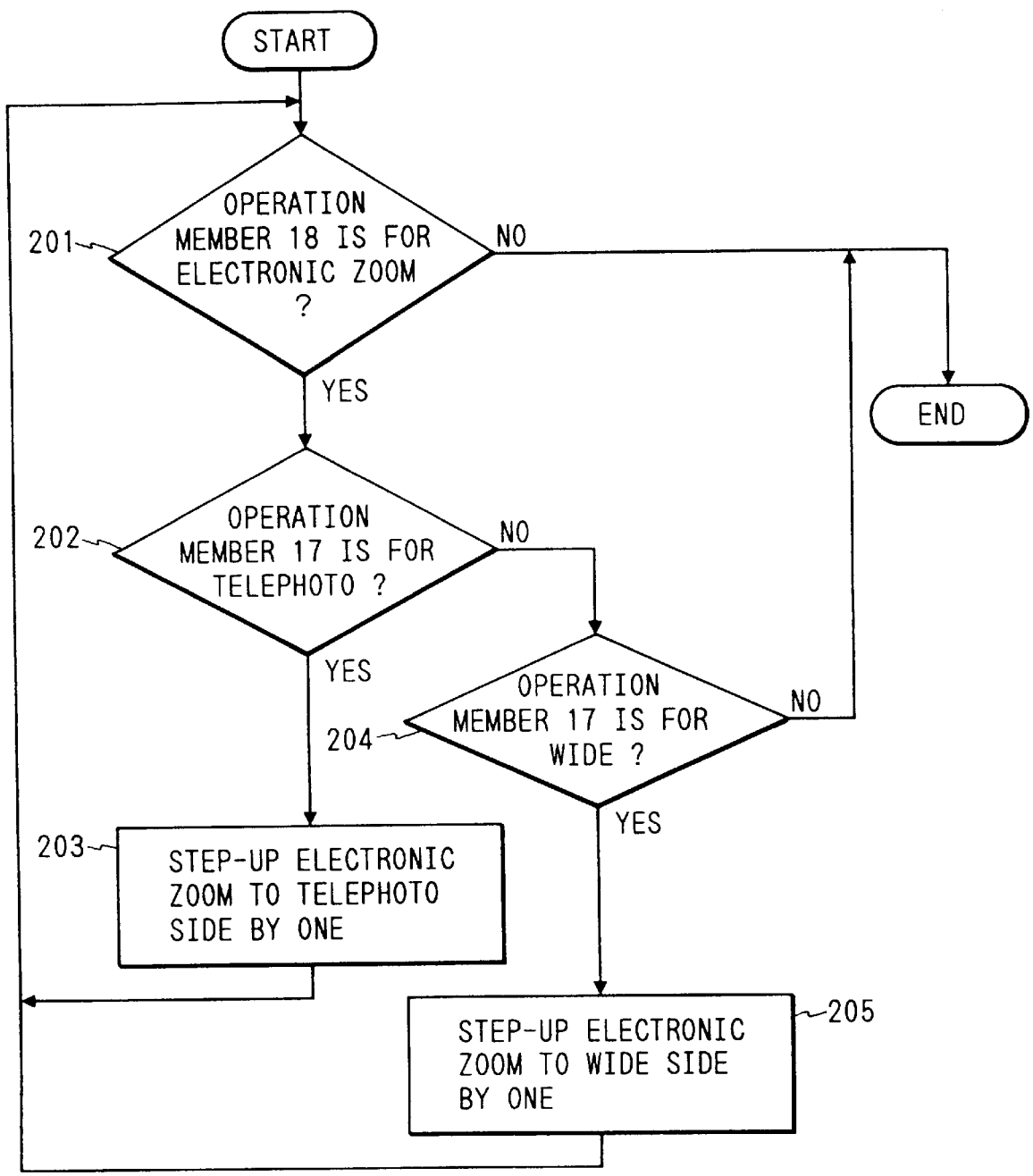
FIG. 9 is a flow chart showing another embodiment of an image pickup apparatus according to the present invention.

FIG. 9 is a flow chart showing another embodiment of an image pickup apparatus according to the present invention. In the above embodiment, the electronic zoom function is effective for only the telephoto side. However, in this embodiment, a high-speed zooming operation can be performed toward both the telephoto and wide sides using only the electronic zoom function. The arrangement of an image pickup apparatus of this embodiment is the same as that of the image pickup apparatus shown in FIG. 7.

The operation of this embodiment will be described below with reference to FIG. 9.

In the image pickup apparatus shown in FIG. 7, an optical focal length is set at the most wide side (not the wide end) which can be used without using an electronic zoom function.

Then, as shown in FIG. 9, the system controller 16 checks the state of the operation member 18, and determines if an electronic zoom mode is selected (step 201). If NO in step 201, since a known operation mode is started, the operation is ended.

However, if the electronic zoom mode is selected (YES in step 201), the system controller 16 checks the operation state of the operation member 17 to determine if the operation member 17 is operated toward the telephoto side (step 202). If the operation member 17 is operated toward the telephoto side (YES in step 202), the system controller 16 issues an instruction to the memory controller 10 and the operation circuit 12 to shift the electronic zoom function toward the telephoto side by one step (step 203), and thereafter, the flow returns to step 201.

If it is determined in step 202 that the operation member 17 is not operated toward the telephoto side (NO in step 202), the system controller 16 then checks if the operation member 17 is operated toward the wide side (step 204). If the operation member 17 is operated toward the wide side (YES in step 204), the electronic zoom function is shifted toward the wide side by one step like in step 203 (step 205), and thereafter, the flow returns to step 201.

If it is determined in step 204 that the operation member 17 is not operated toward the wide side (NO in step 204), since the operation member 17 is operated toward neither the telephoto side nor the wide side, the operation is ended.

Still another embodiment of the present invention will be described below.

Tilt (shift) adjustment is originally an operation for correcting an inclined vertical line to a vertical state.

In this embodiment of the present invention, a reference line (the reference line means a line such as a solid line, broken line, or the like serving as a reference for tilt adjustment, and a vertical line and lines including vertical lines, e.g., lattice lines, can be used) is generated in an electronic view finder (EVF), and tilt (shift) adjustment is performed with reference to the reference line, so that a high-precision composition setting operation can be easily attained. In this embodiment, when it is difficult to perform a high-precision composition setting operation due to a small screen of the EVF, an enlarged display may solve this problem.

An image pickup apparatus of this embodiment will be described in detail below.

Figure 10:
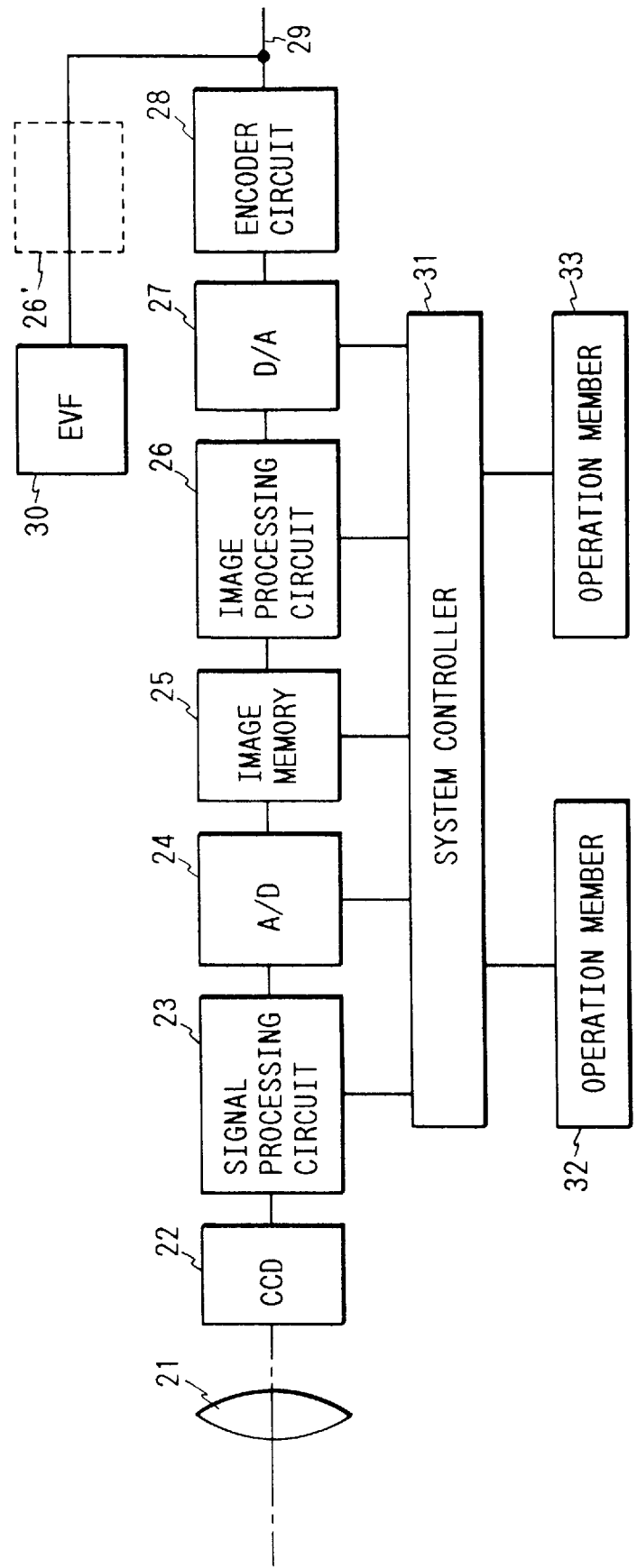
FIG. 10 is a block diagram showing still another embodiment of an image pickup apparatus according to the present invention.

FIG. 10 is a block diagram showing an electrical circuit arrangement of an image pickup apparatus of this embodiment.

Referring to FIG. 10, an optical system 21 forms an object image on the surface of an image pickup element (to be described below). An image pickup element 22 converts an optical image obtained by the optical system 21 from an optical signal into an electrical signal, and comprises a CCD type sensor, a MOS type sensor, or the like. A signal processing circuit 23 processes a sequential signal associated with an object image obtained from the image pickup element 22. An A/D converter 24 converts an electrical signal (analog signal) processed by the signal processing circuit 23 into a digital signal. An image memory 25 stores image information for one frame. An image processing circuit 26 performs the same image conversion processing as an operation of a tilt (shift) lens. Since such coordinate conversion processing can be easily realized by a known digital operation circuit, a detailed description thereof will be omitted.

A D/A converter 27 converts the image processed digital signal into an analog signal. An encoder circuit 28 converts the D/A-converted analog signal into a standard video signal 29 such as an NTSC/PAL signal, or the like. An electronic view finder (EVF) 30 is used for confirming a photographing frame. A system controller 31 checks the operation state of an operation member (to be described later), and the like, and controls the respective elements according to the state of the operation member. The system controller 31 can be easily realized using a versatile microprocessor.

An operation member 32 is used for selecting whether a tilt (shift) operation is performed (ON) or not (OFF). An operation member 33 is used for performing the tilt operation when the operation member 32 is ON. The operation member 33 can be either an independent operation member or an existing operation member (e.g., a power zoom or power focus operation member) having an up/down function. If the operation member 33 is exclusively used for the tilt operation, the operation member 32 can be omitted.

The operation of the above-mentioned electrical circuit arrangement of the image pickup apparatus of this embodiment will be described below.

Note that the arrangement of this embodiment is a very ordinary known image pickup apparatus, except for the operation member associated with the tilt operation and an image processing section therefor. In the following description, a portion associated with the tilt operation will be mainly described below.

Figure 11:
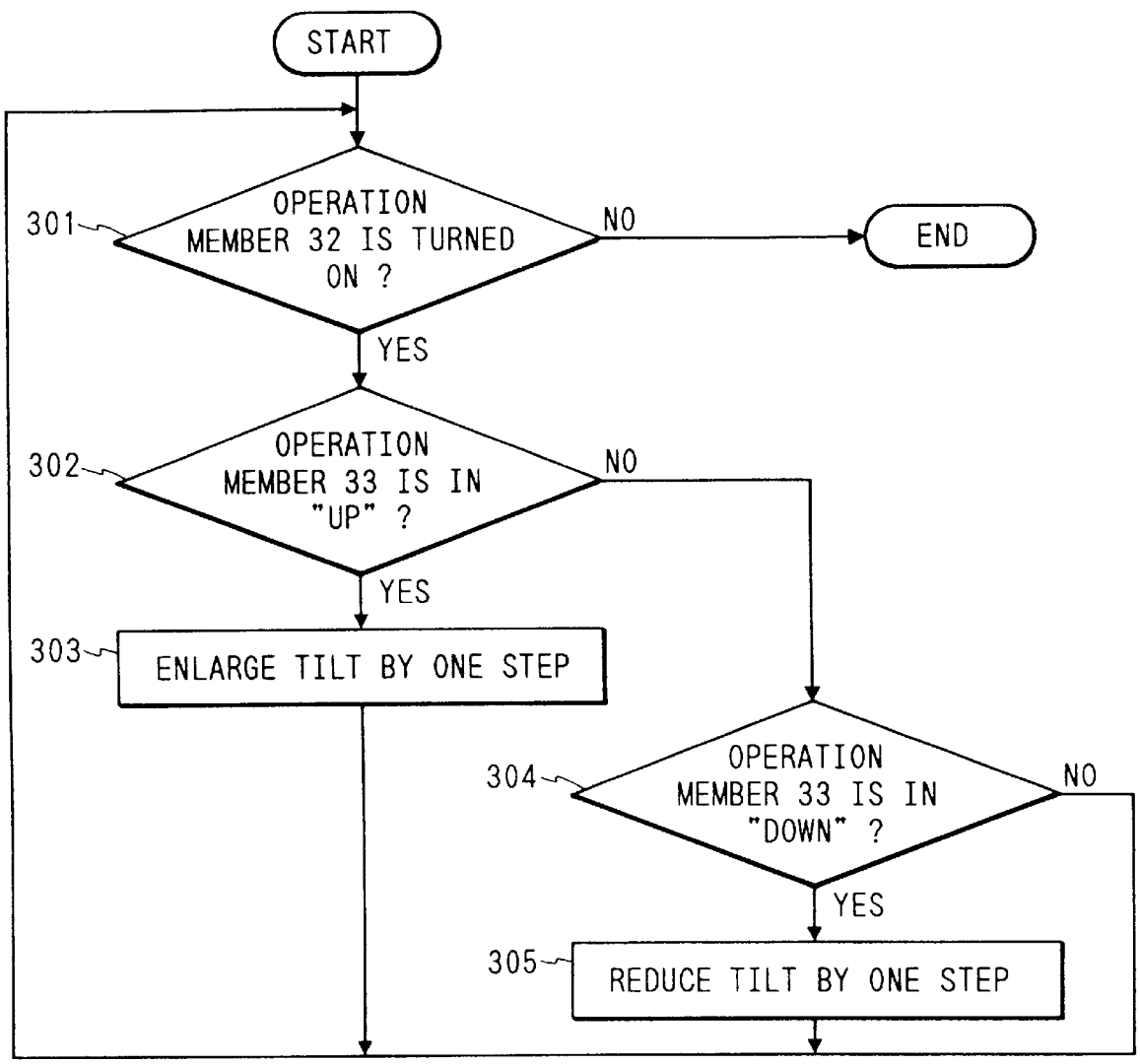
FIG. 11 is a flow chart for explaining an operation of the image pickup apparatus according to the embodiment shown in FIG. 10.

FIG. 11 is a flow chart for explaining the operation of the image pickup apparatus of the embodiment shown in FIG. 10.

As shown in FIG. 11, the system controller 31 checks the state of the operation member 32 for selecting the tilt operation, and determines if a tilt operation mode is ON (step 301).

If the operation member 32 for selecting the tilt operation does not indicate that the tilt operation mode is OFF (NO in step 301), the operation is ended.

However, if the operation member 32 for selecting the tilt operation indicates that the tilt operation mode is ON (YES in step 301), the system controller 31 then checks the state of the operation member 33.

The system controller 31 checks if the operation member 33 instructs an up operation (step 302). If the operation member 33 instructs an up operation (YES in step 302), the tilt level is enlarged by one step, i.e, the correction amount is increased (step 303). Thereafter, the flow returns to step 301.

If the operation member 33 does not instruct an up operation (NO in step 302), the system controller 31 then checks if the operation member 33 instructs a down operation (step 304).

If the operation member 33 instructs a down operation (YES in step 304), the tilt level is reduced by one step, i.e., the correction amount is decreased (step 305). Thereafter, the flow returns to step 301.

If the operation member 33 does not instruct a down operation (NO in step 304), since the operation member 33 instructs neither the up operation nor the down operation, the flow returns to step 301 without any operation.

A display on the EVF 30 during tilt adjustment will be described below.

Figure 12:
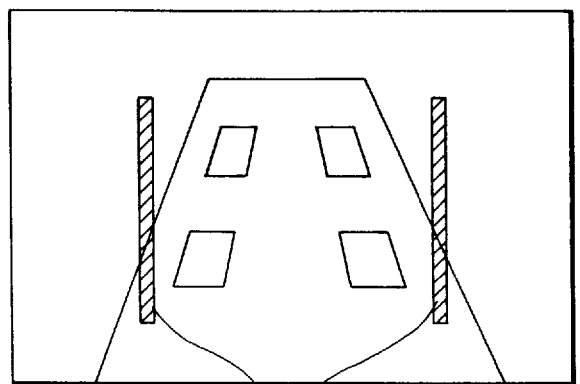
FIG. 12 is a view for explaining tilt adjustment in an image pickup apparatus according to still another embodiment of the present invention.

The image processing circuit 26 (FIG. 10) can easily have a function for generating reference vertical lines, as shown in FIG. 12, by a known technique. With this function, since vertical (tilt) adjustment can be performed with reference to these reference vertical lines, tilt adjustment can be easily performed with high precision.

In this case, the two reference vertical lines are generated. However, the number of reference lines can be arbitrarily set, and the positions of the reference lines can be easily changed by a known method.

Figure 13A:
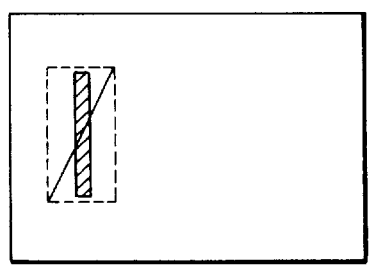
FIGS. 13A and 13B are views for explaining tilt adjustment in an image pickup apparatus according to still another embodiment of the present invention.
Figure 13B:
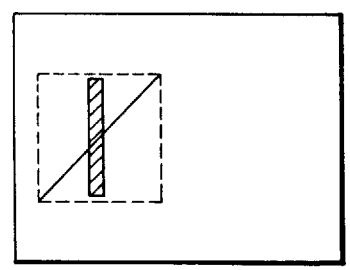

As shown in FIG. 13B, when a portion around the reference vertical line is displayed in an enlarged scale in the horizontal direction from a state shown in FIG. 13A, a shift from the vertical direction can be displayed in an enlarged scale, thus facilitating adjustment. Note that the reference vertical line may be displayed in an enlarged scale in the vertical direction, as a matter of course.

Figure 14A:
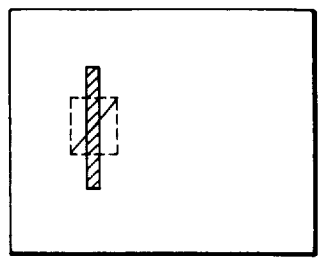
FIGS. 14A and 14B are views for explaining tilt adjustment in an image pickup apparatus according to still another embodiment of the present invention.
Figure 14B:
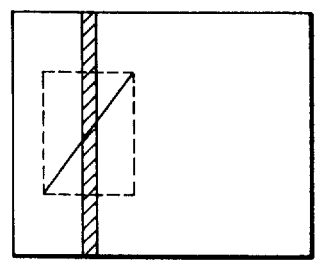

When an adjustment target portion is only a small part in a frame, as shown in FIG. 14A, it may be displayed in an enlarged scale in both the vertical and horizontal directions, as shown in FIG. 14B, thus allowing easy adjustment.

Figure 15:
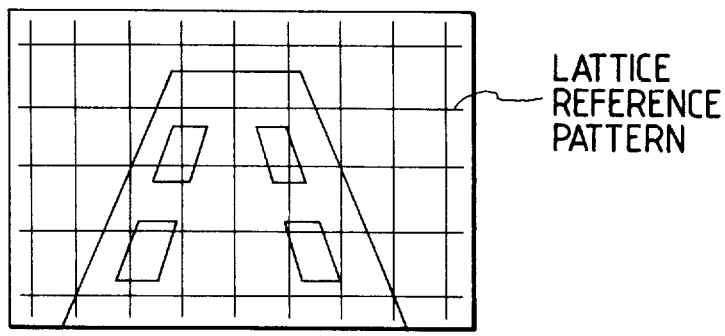
FIG. 15 is a view for explaining tilt adjustment in an image pickup apparatus according to still another embodiment of the present invention.

In addition, a lattice reference pattern may be employed, as shown in FIG. 15.

Note that the image processing circuit 26 is assumed to have the reference line generation function in the above description. However, if it is not preferable that signals indicating the above-mentioned reference lines are mixed in the signal 29 on the signal output line, a reference line insertion circuit may be added at a position 26' in FIG. 10 (immediately before the EVF 30).

As can be apparent from the above description, when the image pickup apparatus of the embodiment shown in FIG. 7 is used, a composition can be quickly determined by the electronic zoom function, and at the same time, the electronic zoom function is gradually replaced with the optical zoom mechanism while maintaining the composition. For this reason, deterioration of image quality caused by the electronic zoom function occurs for only a short period of time. When a quick composition setting operation is most important, the electronic zoom function may be enabled in both the telephoto and wide directions without being replaced with the optical zoom mechanism.

When the image pickup apparatus of the embodiment shown in FIG. 10 is used, since tilt adjustment can be performed with respect to the reference lines while observing a small screen of the EVF, high-precision adjustment can be quickly performed.

What is claimed is:

1. A lens position control device, comprising:
   a zoom lens having a variable magnification lens group and a focusing lens group;
   image pickup means for converting an optical image formed by said zoom lens into an electrical signal;
   signal processing means for executing signal processing of the electrical signal so as to obtain an electronic zooming effect;
   focus detection means for detecting a focus condition;
   storage means for storing information associated with movement of a focusing lens group according to lens positions of said variable magnification lens group and said focusing lens group of said zoom lens; and
   control means for controlling said zoom lens and said signal processing means on the basis of the focus condition detected by said focus detection means that said zoom lens is in an in-focus condition, to move said focusing lens group on the basis of the position of said variable magnification lens group and the information stored in said storage means, and, in the case that it is determined that said zoom lens is in an out-of-focus condition, to perform a zooming operation on the basis of a signal processing result of said signal processing means, and to move said focusing lens group on the basis of information detected by said focus detection means.

2. A device according to claim 1, wherein when a zoom function is switched between an optical zoom function and the electronic zoom function, one zoom operation is started before the other zoom operation is stopped.

3. An image sensing apparatus comprising:
   a zoom lens having a variable magnification lens group and a focusing lens group;
   image pickup means for converting an optical image formed by said zoom lens into an electrical signal;
   signal processing means for executing signal processing of the electrical signal so as to obtain an electronic zoom effect; and
   control means for selectively switching an optical zoom function by said zoom lens and an electronic zoom function by said signal processing means, wherein an operation range of the optical zoom function and an operation range of the electronic zoom function are overlapped by each other.

4. A photographing apparatus comprising:
   a zoom lens having a variable magnification lens group and a focusing lens group;
   image pickup means for converting an optical image formed by said zoom lens into an electrical signal; and
   signal processing means for executing signal processing of the electrical signal so as to obtain an electronic zoom effect,
   wherein said apparatus having an optical zoom function achieved upon movement of said variable magnification lens group, and an electronic zoom function, and wherein the optical and electronic zoom functions are driven at the same time, when a zoom function is changed from one of the optical zoom function and the electronic zoom function to the other.

5. An image pickup apparatus comprising:
   (a) optical means comprising a variable magnification lens group and a focusing lens group;
   (b) image pickup means for converting image pickup light of an object incident through said optical means into an electrical signal;

(c) electronic zoom means for electrically performing a zoom operation using the electrical signal;

(d) detection means for detecting a focus adjustment state; and (e) control means for controlling said optical means and said electronic zoom means according to an output of said detection means to drive said focusing lens group while driving said electronic zoom means in the case that an in-focus state is not attained.

6. An apparatus according to claim 5, wherein said control means includes a microcomputer.

7. An apparatus according to claim 5, wherein said electronic zoom means includes memory means for storing the electrical signal, and memory control means for controlling a signal read access to said memory means.

8. An image pickup means, which adopts a zoom lens in an image pickup optical system, and has an electronic zoom function for electronically performing a zoom operation of a signal read from an image pickup element, wherein after a magnification of a composition is determined by the electronic zoom function, a magnification of said zoom lens is varied to the magnification attained by the electronic zoom function and then the magnification of the electronic zoom is reduced.

9. An apparatus according to claim 8, wherein while the magnification is changed by said zoom lens, the electronic zoom function is driven in a direction to cancel the change in magnification attained by said zoom lens so as to obtain a constant image pickup magnification.

10. An apparatus according to claim 8, wherein a zoom speed of the electronic zoom function is higher than an optical zoom speed of said zoom lens.

11. An image pickup apparatus having the same function as a tilt lens by means of image processing, comprising:

image pickup means for picking up an image and outputting an image signal;

image processing means for performing image signal processing to generate image data of a reference line;

displaying means for displaying the reference line on an electronic monitor with the image signal;

magnifying means for magnifying the image to be displayed on said monitor; and control means, in response to a tilt adjustment operation, for causing said displaying means to display the reference line with image signal on said monitor and causing said magnifying means to magnify the image displayed on said monitor.

12. An apparatus according to claim 11, wherein a portion near the reference line can be selectively displayed in an enlarged scale in a predetermined direction.

13. An apparatus according to claim 11, wherein the reference line is a vertical line.

14. An apparatus according to claim 11, wherein the reference line is a lattice line pattern.

15. An image processing apparatus, comprising:

(a) optical magnification change means for optically changing magnification of image information in a picture screen;

(b) electronic magnification change means for electronically changing the magnification of the image information in the picture screen by performing a predetermined signal processing on the image information;

(c) discrimination means for discriminating a focus condition, as the image information in the picture screen; and (d) control means for controlling operation sequences of said optical magnification change means and said electronic magnification change means on the basis of an output of said discrimination means.

16. An apparatus according to claim 15, wherein said electronic magnification change means stores an image signal in a memory and changes a read-out range of the memory to provide an enlarged image.

17. An apparatus according to claim 15, wherein said discrimination means is focus detection means for detecting a focusing state as to the image information.

18. An apparatus according to claim 17, wherein said control means operates said electronic magnification change means in the case that a defocus state is detected by said focus detection means, and operates said optical magnification change means in the case that an infocus state is detected by said focus detection means.

19. An apparatus according to claim 18, wherein said control means operates said electronic magnification change means when the defocus state is detected by said focus detection means and causes said optical magnification change means to operate in response to the detection of the infocus state by said focus detection means.

20. An apparatus according to claim 15, wherein the picture screen is a screen of a viewfinder.

21. A device according to claim 2, wherein said control means performs the electronic zoom function in the case of the out of focus state, and then performs the optical zoom function.

22. A device according to claim 21, wherein when a zooming operation is performed by said zoom lens in the case of the out of focus state, the electronic zoom is driven first and then switched to the optical zoom when an in-focus state is nearly attained.

23. A device according to claim 22, wherein said control means sets product of magnification of the electronic zoom and magnification of the optical zoom as whole magnification.

24. An apparatus according to claim 3, wherein said apparatus drives the optical zoom function first and then drives the electronic zoom function, when said apparatus performs a zooming operation.

25. An apparatus according to claim 24, wherein said signal processing means includes memory means for storing the electrical signal, and memory control means for controlling a signal read access to said memory means.

26. An apparatus according to claim 3, wherein while magnification is changed by said zoom lens, an electronic zoom function is driven in a direction to cancel the change in magnification attained by said zoom lens so as to obtain a constant image pickup magnification.

27. An apparatus according to claim 3, wherein a zoom speed of an electronic zoom operation is higher than an optical zoom speed of said zoom lens.

28. An apparatus according to claim 4, wherein said signal processing means includes memory means for storing the electrical signal, and memory control means for controlling a signal read access to said memory means.

29. An apparatus according to claim 4, wherein whole magnification of said apparatus is provided by product of magnification of the electronic zoom function and magnification of the optical zoom function.

\* \* \* \* \*

UNITED STATES PATENT AND TRADEMARK OFFICE
CERTIFICATE OF CORRECTION

PATENT NO. : 5,867,217
DATED : February 2, 1999
INVENTOR(S) : Tadashi Okino, Harunobu Ichinose It is certified that error appears in the above-identified patent and that said Letters Patent is hereby corrected as shown below:

Col. 9, line 8, delete "controls" and insert -- control --.

Signed and Sealed this

Twenty-first Day of December, 1999

Attest:

Q. TODD DICKINSON

Attesting Officer

Acting Commissioner of Patents and Trademarks